US008600727B2

(12) United States Patent
Strong et al.

(10) Patent No.: US 8,600,727 B2
(45) Date of Patent: Dec. 3, 2013

(54) STREAMLINED EXECUTION OF EMULATED CODE USING BLOCK-BASED TRANSLATION MODE (75) Inventors: David Strong, Irvine, CA (US); Andrew Ward Beale, Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 179 days.

(21) Appl. No.: 13/270,256

(22) Filed: Oct. 11, 2011

(65) Prior Publication Data

US 2013/0090913 A1 Apr. 11, 2013

(51) Int. Cl.
G06F 9/455 (2006.01)

(52) U.S. Cl.
USPC .............. 703/26; 703/23; 717/134; 717/138

(58) Field of Classification Search
USPC .............. 703/23, 26; 717/129, 134, 138, 145, 717/146, 153; 716/103; 712/208; 713/188; 719/331; 726/24
See application file for complete search history.

(56) References Cited

U.S. PATENT DOCUMENTS 5,991,757 A * 11/1999 Dahl et al. ............... 703/23
6,164,841 A * 12/2000 Mattson et al. .......... 716/103
6,189,141 B1 * 2/2001 Benitez et al. ........... 717/153
7,568,189 B2 * 7/2009 Suba et al. ............... 717/145
2002/0147969 A1 * 10/2002 Lethin et al. ............. 717/138
2004/0054993 A1 * 3/2004 Nair et al. ................ 717/138
2007/0016953 A1 * 1/2007 Morris et al. ............. 726/24
2007/0256063 A1 * 11/2007 Souloglou et al. ....... 717/146
2008/0127114 A1 * 5/2008 Vasudevan ................ 717/129
2008/0209175 A1 * 8/2008 Brown ..................... 712/208
2009/0172713 A1 * 7/2009 Kim et al. ................ 719/331
2011/0153307 A1 * 6/2011 Winkel et al. ............ 703/26
2012/0290848 A1 * 11/2012 Wang et al. .............. 713/188

* cited by examiner

Primary Examiner — Kandasamy Thangavelu
(74) Attorney, Agent, or Firm — James E. Goepel (57) ABSTRACT Methods and systems are disclosed, including a method for executing a non-native code stream on a computing system. The method includes forming one or more blocks of emulated mode code for execution on a computing system. Each of the one or more blocks includes a preamble and a plurality of operators ordered for execution in a predetermined sequence, wherein for a specified block the preamble defines one or more conditions required for uninterrupted execution of the operators included in the specified block. The method also includes assessing the one or more conditions associated with the specified block, and, after assessing the one or more conditions, executing each of the operators included in the specified block without assessing any of the one or more conditions between execution of the operators within the specified block.

22 Claims, 9 Drawing Sheets

STREAMLINED EXECUTION OF EMULATED CODE USING BLOCK-BASED TRANSLATION MODE

TECHNICAL FIELD

The present application relates generally to computational performance, and in particular relating to execution of emulated software. In particular, the present disclosure relates to streamlining execution of emulated code using a block-based translation mode.

BACKGROUND

A computing system generally includes a central processing unit that is configured to execute program instructions which are ordered and arranged to execute various tasks. Each central processing unit has a predefined set of instructions capable of execution on that system, referred to as an instruction set. The instruction set executable by a central processing unit defines the instruction set architecture of that central processing unit.

Often, it is desirable to run software written for a particular instruction set architecture on a computing system that has a different, and incompatible, instruction set architecture. To do so, the software must be translated from the instruction set in which it is written to an instruction set compatible with the target central processing unit. This can be done at least two different ways. First, if source code is available, it can be recompiled onto the new instruction set architecture using a compiler specific to that architecture. Second, if source code is not available or if for some other reason the binary program is the desired source from which operation is to be derived, the software can be translated onto the new instruction set architecture by translating the binary program onto the new instruction set architecture on an instruction-by-instruction basis.

To accomplish execution of binary code on a non-native instruction set architecture, the binary code is often translated using an emulator designed for a target instruction set architecture. An emulator is a set of software modules that is configured to execute binary code from its native format in a way that is recognizable on a target computing system executing the target instruction set architecture. This code, referred to as emulation mode code, is parsed by the emulator to detect operators and other information that are then translated to be executed in a manner recognizable on the target computing system.

When emulation mode code is translated and executed on a computing system, the computing system executing that code must typically perform a number of status checking operations concurrently with execution. This is because, when emulation mode code executes in a computing environment, there is no guarantee that specific computing resources have not been altered between execution of operators. For example, arrays can be relocated in memory, resized (larger or smaller), or can be paged into or out from memory. Additionally, working software stacks can be relocated, and code to be executed might be discarded altogether by the emulated operating system. To account for these possibilities, a number of status checks must be performed by the emulator executing in the native operating system, to ensure that any assumptions made regarding locations of objects in memory have not changed between instructions. As a result of this overhead, execution of emulation mode code on a target computing system can be much slower than execution on a native computing system, even if that target computing system has substantially greater computing resources when compared to the native computing system.

For these and other reasons, improvements are desirable.

SUMMARY

In accordance with the following disclosure, the above and other issues are addressed by the following:

In a first aspect, a method for executing a non-native code stream on a computing system is disclosed. The method includes forming one or more blocks of emulated mode code for execution on a computing system. Each of the one or more blocks includes a preamble and a plurality of operators ordered for execution in a predetermined sequence, wherein for a specified block the preamble defines one or more conditions required for uninterrupted execution of the operators included in the specified block. The method also includes assessing the one or more conditions associated with the specified block, and, after assessing the one or more conditions, executing each of the operators included in the specified block without assessing any of the one or more conditions between execution of the operators within the specified block.

In a second aspect, a system includes an emulator configured to manage execution of a non-native code stream on a computing system, the emulator including a translation component configured to generate emulated mode code based on the non-native code stream. The system also includes a plurality of blocks of emulated mode code, each of the one or more blocks including a preamble and a plurality of operators ordered for execution in a predetermined sequence. For a specified block the preamble defines one or more conditions required for uninterrupted execution of the operators included in the specified block. The emulator is configured to assess the one or more conditions associated with the specified block, and, after assessing the one or more conditions, execute each of the operators included in the specified block without assessing any of the one or more conditions between execution of the operators within the specified block.

In a third aspect, a computing system is disclosed that includes a programmable circuit capable of executing operators according to a native instruction set architecture, and a memory operatively connected to the programmable circuit. The memory contains program instructions executable on the programmable circuit and which, when executed, cause the computing system to form a plurality of blocks of emulated mode code for execution on the programmable circuit from a non-native code stream, each of the plurality of blocks including a preamble, a postamble, and a plurality of operators ordered for execution in a predetermined sequence, wherein for a specified block the preamble defines one or more conditions required for uninterrupted execution of the operators included in the specified block. The program instructions also, when executed, cause the computing system to assess the one or more conditions associated with the specified block, and after assessing the one or more conditions, execute each of the operators included in the specified block without assessing any of the one or more conditions between execution of the operators within the specified block. The program instructions also, when executed, cause the computing system to, upon completion of execution of the specified block, perform one or more operations defined in the postamble.

DETAILED DESCRIPTION

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for executing a code stream of non-native binary code on a computing system. By non-native, it is intended that a binary code stream received by a computing system cannot be executed directly on a computing system without some type of translation, for example within an emulator or other pre-execution translation system. In general, the systems and methods of the present disclosure provide increased efficiency in executing emulated code streams by grouping environmental or system-level system-state checks, and grouping operators included in emulated code streams into blocks to be executed in immediate sequence, without requiring status checks of system resources such as register contents, stack sizes, or memory address validity. In some cases, careful handling of interrupts, and interrupt timing, allows for reduced interrupting of the ordered blocks of operators. Accordingly, assumptions and data dependencies relied on by each instruction can be validated once for a group or block of operators, rather than before/after each operator is executed. Additionally, through careful grouping of operators, additional efficiencies can be gained through grouping non-native operators when translating into operators executable by the native instruction set architecture.

Figure 1:
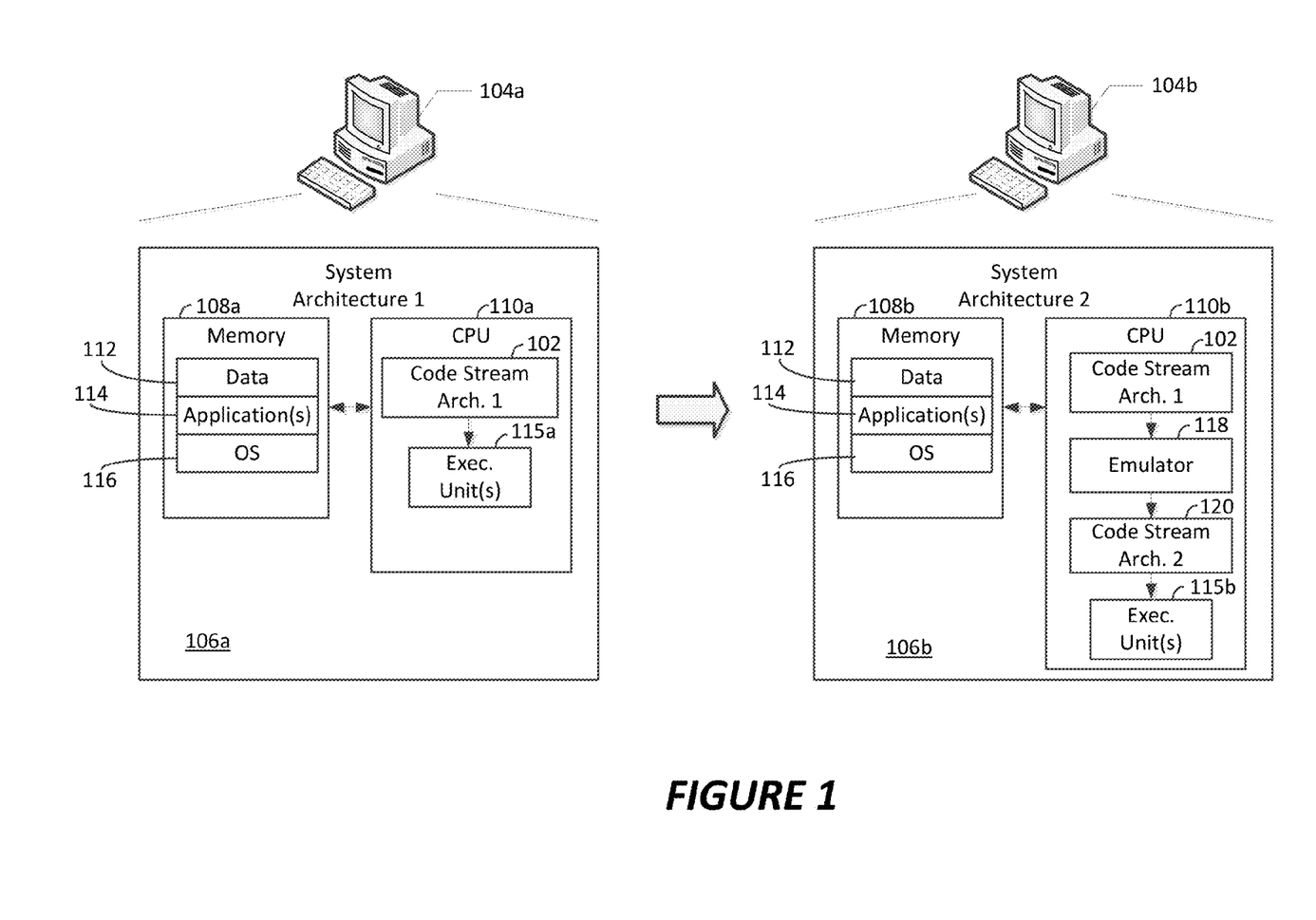
FIG. 1 is a schematic illustration of a plurality of computing systems operating using incompatible instruction set architectures.

Referring now to FIG. 1, a schematic illustration of a plurality of computing systems operating using incompatible instruction set architectures is shown. The illustration shown in FIG. 1 is intended to illustrate execution of a code stream 102 on two computing systems 104a-b using different and incompatible instruction set architectures. In other words, while code stream 102 executes natively on the hardware provided as part of computing system 104a, it is non-native to the computing system 104b, meaning that computing system operates using a different set of instructions, and cannot natively execute those instructions, or operators, included in the code stream.

In further specific detail regarding this distinction between native and non-native execution of a code stream, computing system 104a has a first system architecture 106a, and computing system 104b has a second system architecture 106b. Computing system 104a includes a memory 108a and processing unit 110a, while computing system 104b has a memory 108b and processing unit 110b. Typically, in systems having a different system architecture, different memory address sizes and different instruction lengths may be employed, as well as different sets of registers or other resources within the processing units 110a-b.

In the example shown, each memory 108 includes a variety of different types of stored information, including data 112, applications 114, and an operating system 116. On computing system 104a, the operating system executes natively using the system architecture 106a, and controls operation of the applications 114 and access to data 112. The resulting code stream 102 represents a sequence of binary operations and data that are parsed and executed on the computing system 104a, within one or more execution units 115a of the processing unit 110a.

In contrast, the same data 112, applications 114, and operating system 116 can be stored in memory 108b and can form code stream 102, but that code stream cannot directly be executed by the processing unit 110b. Rather, the code stream 102 is passed to an emulator 118, which converts the code stream 102, which is non-native with respect to system architecture 106b, to a second code stream 120 which is native to that system architecture. That second code stream 120 can then be executed on execution units 115b of the processing unit 110b.

When executing the second code stream 120 on the computing system 104b, the computing system 104b may in certain embodiments require checking of system resources between operators, to ensure that any architectural assumptions inherent in the operator sequence of the second code stream 120 are valid. This can include, for example, differences between the architectures of the computing system 104a-b, such as different stack sizes, different memory addressing schemes, or different register sizes, numbers, or interrupt handling. In conjunction with the present disclosure, the second code stream 120 is analyzed and translated such that, rather than checking a state of the computing system 104b before each translated operator is executed to ensure that such differences would not affect execution of the emulated operator, operators are grouped into logical arrangements in which such system checks are unnecessary between operators, since system status would not change based on the types of operators that are grouped together into such blocks Referring now to FIG. 2, an example computing system 200 is disclosed which can be configured to execute such block-based, non-native code streams, is illustrated. The computing system 200 can, for example, execute block-based emulated code as processed by emulator software. The computing system 200 can in some embodiment represent computing system 104b, reflecting the fact that at one time the non-native code stream received at the computing system 200 was written for an instruction set architecture supported by a different hardware system.

Figure 2:
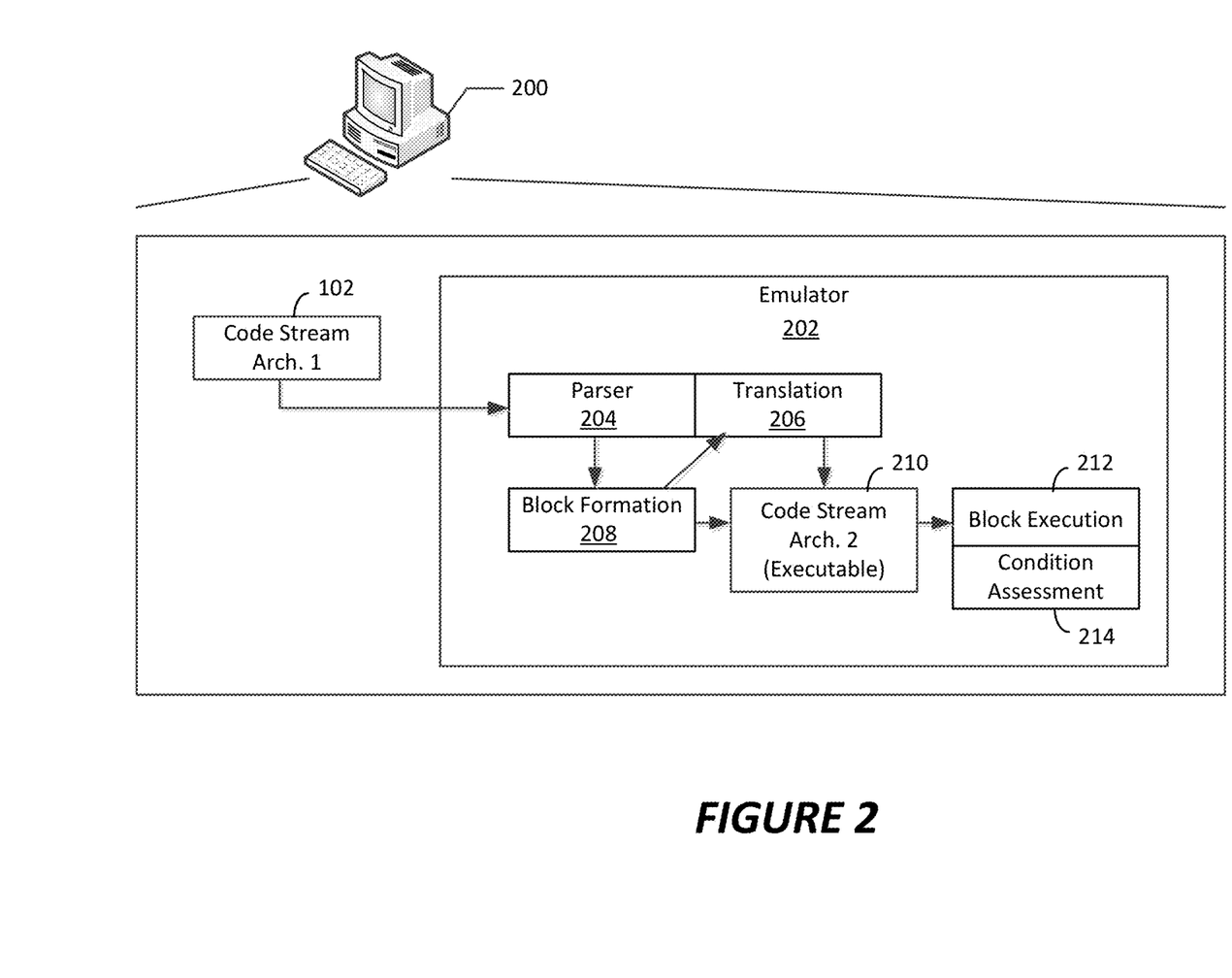
FIG. 2 is a schematic illustration of a target computing system executing emulated code derived from a non-native code stream, according to a possible embodiment of the present disclosure.

The computing system 200 is configured to receive a code stream 102 in memory, and execute that code stream using an emulator 202. As discussed above, the code stream 102 is a non-native code stream, meaning that it is written for execution on an instruction set architecture that is incompatible with the instruction set architecture of the computing system 200. In some embodiments of the present disclosure, the computing system 200 operates using an Intel-based instruction set architecture (e.g., IA32, IA32-x64, IA64, etc.), while the code stream 102 can be written for any of a number of other types of instruction set architectures, such as PowerPC, ARM, MIPS, SPARC, or other similarly incompatible system architectures. The emulator can take a number of forms, but is typically arranged to parse through the code stream one or more times to decompose the code stream into elements describing its contents to provide efficient executable code using the instruction set architecture of the computing system 200.

The emulator 202 is analogous to emulator 118 of FIG. 1, and is configured to decompose the code stream 102 into its constituent operators and parameters for analysis and translation. In the embodiment shown, the emulator 202 includes a parser component 204 and a translation component 206. The parser component 204 generally parses the code stream 102 and identifies types of operators and data contained within the code stream. The translation component 206 then translates the operators received in the code stream 102 into native, translated operators executable on the computing system 200. Details regarding a particular methodology for parsing and translation of the code stream are discussed in copending U.S. patent application Ser. No. 13/246,273, entitled "Abstracting Computational Instructions to Improve Performance", filed Sep. 27, 2011, the disclosure of which is hereby incorporated by reference in its entirety.

In addition to the parser component 204 and translation component 206, a block formation component 208 receives the output of the parser 204, which includes identification of branches and branch target locations, as well as instructions that would otherwise affect flow control within the code stream 102. This could include, for example, operators that might change memory semantics within the system for subsequent operators. In such a case, a block separation could occur after that operator, allowing the system to handle the memory system change prior to initiating execution of subsequent blocks. The block formation component 208 forms groups of operators based on this parsed information based on the code stream 102. In example embodiments, the block formation component 208 determines potential block boundaries based on branches and branch targets, with each possible branch target representing a potential beginning of a block. The block formation component 208 can then analyze sequences of operators between branch targets or end of block operators, (e.g., control words), to determine whether a sufficient number of operators exist in sequence, and whether translation of those operators provides any increase in efficiency based on their grouping. For example, in some circumstances, a group of two or more operators can be grouped and executed using one or more native operators. Additionally, sequences of native operators may be sufficiently independent that each would not affect subsequent operators' resource usage in the computing system, and therefore resource and status checking occurrences between operators may be avoided. However, in certain embodiments, not all operators are placed into such blocks. Examples of blocks formed by the block formation component 208 are discussed below in conjunction with FIGS. 5-8.

Based on the parser component 204, translation component 206, and the block formation component 208, an executable code stream 210 is generated. The executable code stream 210 includes, as discussed above, one or more blocks of code capable of sequential execution, rather than operator-by-operator execution with system checks occurring between each operator. A block execution module 212 works in connection with a condition assessment module 214 to (1) assess one or more conditions associated with the computing system 200, such as memory resources and resource usage on that computing system, and (2) execute one or more translated operators. As further discussed below, execution of translated operators is managed such that at least a portion of a code stream is executed in blocks, such that conditions are assessed before a group of operators is executed, rather than before each operator is executed.

Figure 3:
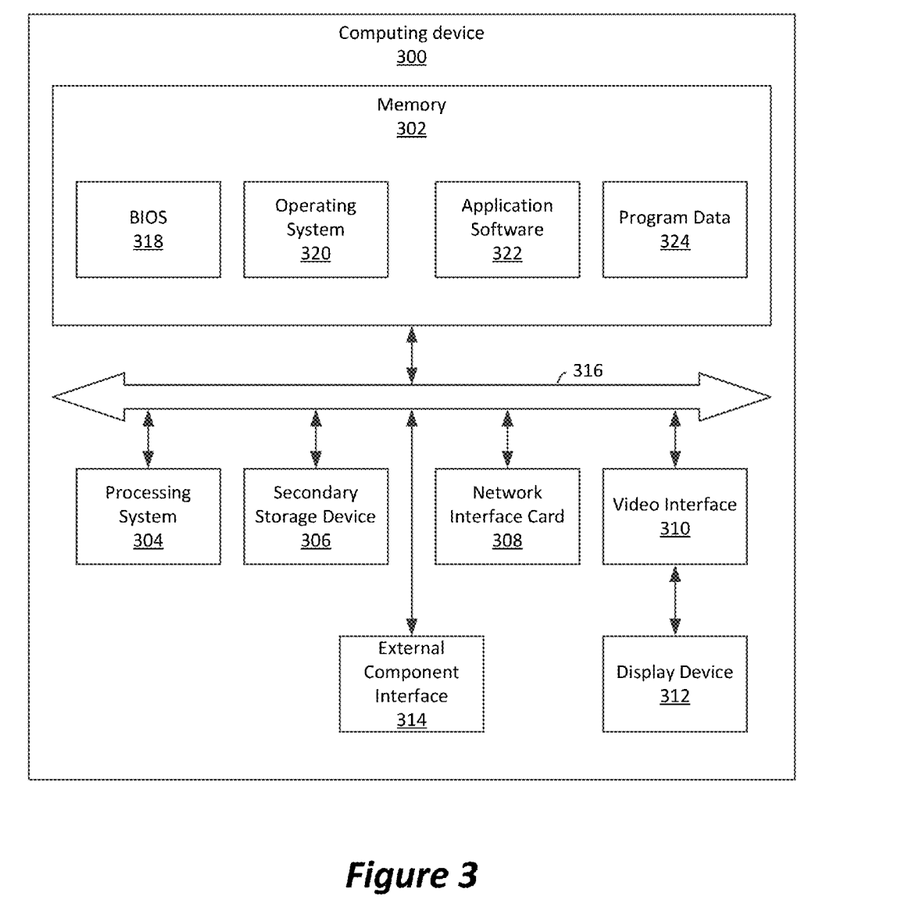
FIG. 3 is a schematic illustration of an example computing system in which aspects of the present disclosure can be implemented.

FIG. 3 is a block diagram illustrating an example computing device 300, which can be used to implement aspects of the present disclosure. In various embodiments, the computing device 300 implements one particular instruction set architecture, and can be used to execute emulation software and/or translate non-native code streams for block-based execution in accordance with the methods and systems described herein.

In the example of FIG. 3, the computing device 300 includes a memory 302, a processing system 304, a secondary storage device 306, a network interface card 308, a video interface 310, a display unit 312, an external component interface 314, and a communication medium 316. The memory 302 includes one or more computer storage media capable of storing data and/or instructions. In different embodiments, the memory 302 is implemented in different ways. For example, the memory 302 can be implemented using various types of computer storage media.

The processing system 304 includes one or more processing units. A processing unit is a physical device or article of manufacture comprising one or more integrated circuits that selectively execute software instructions. In various embodiments, the processing system 304 is implemented in various ways. For example, the processing system 304 can be implemented as one or more processing cores. In another example, the processing system 304 can include one or more separate microprocessors. In yet another example embodiment, the processing system 304 can include an application-specific integrated circuit (ASIC) that provides specific functionality. In yet another example, the processing system 304 provides specific functionality by using an ASIC and by executing computer-executable instructions.

The secondary storage device 306 includes one or more computer storage media. The secondary storage device 306 stores data and software instructions not directly accessible by the processing system 304. In other words, the processing system 304 performs an I/O operation to retrieve data and/or software instructions from the secondary storage device 306. In various embodiments, the secondary storage device 306 includes various types of computer storage media. For example, the secondary storage device 306 can include one or more magnetic disks, magnetic tape drives, optical discs, solid state memory devices, and/or other types of computer storage media.

The network interface card 308 enables the computing device 300 to send data to and receive data from a communication network. In different embodiments, the network interface card 308 is implemented in different ways. For example, the network interface card 308 can be implemented as an Ethernet interface, a token-ring network interface, a fiber optic network interface, a wireless network interface (e.g., WiFi, WiMax, etc.), or another type of network interface.

The video interface 310 enables the computing device 300 to output video information to the display unit 312. The display unit 312 can be various types of devices for displaying video information, such as a cathode-ray tube display, an LCD display panel, a plasma screen display panel, a touch-sensitive display panel, an LED screen, or a projector. The video interface 310 can communicate with the display unit 312 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 314 enables the computing device 300 to communicate with external devices. For example, the external component interface 314 can be a USB interface, a FireWire interface, a serial port interface, a parallel port interface, a PS/2 interface, and/or another type of interface that enables the computing device 300 to communicate with external devices. In various embodiments, the external component interface 314 enables the computing device 300 to communicate with various external components, such as external storage devices, input devices, speakers, modems, media player docks, other computing devices, scanners, digital cameras, and fingerprint readers.

The communications medium 316 facilitates communication among the hardware components of the computing device 300. In the example of FIG. 3, the communications medium 316 facilitates communication among the memory 302, the processing system 304, the secondary storage device 306, the network interface card 308, the video interface 310, and the external component interface 314. The communications medium 316 can be implemented in various ways. For example, the communications medium 316 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 302 stores various types of data and/or software instructions. For instance, in the example of FIG. 3, the memory 302 stores a Basic Input/Output System (BIOS) 318 and an operating system 320. The BIOS 318 includes a set of computer-executable instructions that, when executed by the processing system 304, cause the computing device 300 to boot up. The operating system 320 includes a set of computer-executable instructions that, when executed by the processing system 304, cause the computing device 300 to provide an operating system that coordinates the activities and sharing of resources of the computing device 300. Furthermore, the memory 302 stores application software 322. The application software 322 includes computer-executable instructions, that when executed by the processing system 304, cause the computing device 300 to provide one or more applications. The memory 302 also stores program data 324. The program data 324 is data used by programs that execute on the computing device 300.

Although particular features are discussed herein as included within an electronic computing device 300, it is recognized that in certain embodiments not all such components or features may be included within a computing device executing according to the methods and systems of the present disclosure. Furthermore, different types of hardware and/or software systems could be incorporated into such an electronic computing device.

In accordance with the present disclosure, the term computer readable media as used herein may include computer storage media and communication media. As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 4:
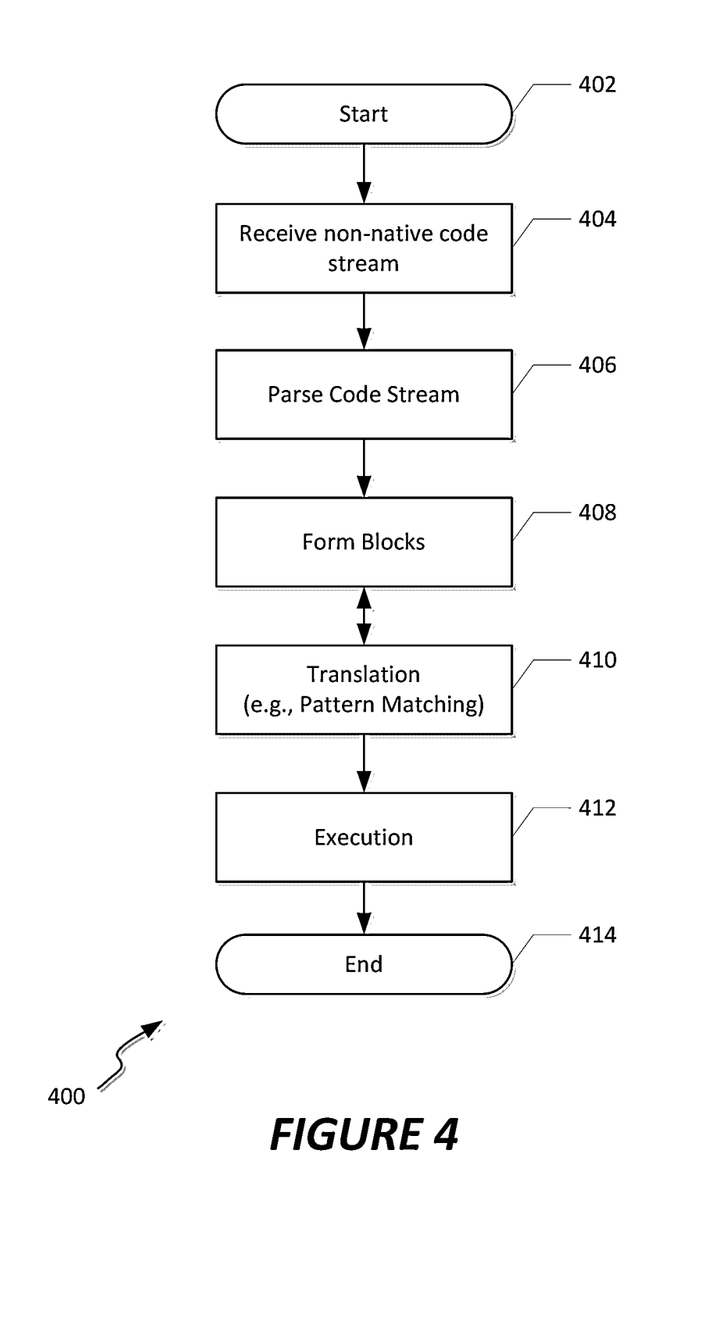
FIG. 4 is a flowchart of a method for executing a non-native code stream on a computing system, according to an example embodiment of the present disclosure.

Referring now to FIG. 4, a flowchart of a method 400 for executing a non-native code stream on a computing system is shown. In this embodiment, the method 400 can be performed, for example, on a computing system executing an emulated mode code stream, such as computing system 200 of FIG. 2.

The method is initiated at a start operation 402, which generally corresponds to initial operation of emulator software on a computing system. A code stream receipt operation 404 receives a non-native code stream at the emulator, for example as retrieved from an image stored in memory of a computing system or received from a remote system. A parser operation 406 traverses the code stream to locate operators and data within the code stream, including locating branch operators, end of block operators, branch targets, and other operator and operator flow dependencies.

A block formation operation 408 forms one or more blocks of emulated mode code from the parsed code stream. The block formation operation 408 includes, in some embodiments, identification of candidate sets of operators within the code stream that are likely to be executed consecutively. In some embodiments, blocks of the code stream are separated by processor control word operators, branches, or branch targets. Other block boundaries could be used as well, such as locations at which memory semantics have changed, or other locations within a code stream where separate interrupt or subprocess execution might be required.

In some example embodiments, the block formation operation 408 generates one or more preconditions that would be required by or assumed by the emulator and which would result in successful execution of the formed block. In such embodiments, when forming the block, the block formation operation 408 may include generating a preamble associated with a block and which includes assessments of such preconditions.

In still further embodiments, the block formation operation 408 can generate one or more postconditions that can be used, for example, to return the computing system on which the emulator is executing to an expected operational state. For example, if the block that is formed uses particular memory, register, stack, or other resources, and changes the state of those resources, the one or more postconditions can return the computing system to its operational state prior to execution of the block.

A translation operation 410 translates the non-native code stream to native operators and data (e.g., using a translator component, as discussed above in connection with FIG. 2) and optionally executes one or more pattern matching operations on the translated code stream to locate efficient corresponding native operators which can provide equivalent functionality to the operators included in the non-native code stream. In certain embodiments, the translation operation 410 lays each of the translated blocks end-to-end for execution, and resolves references that occur across block boundaries. The translation operation 410 also resolves memory addresses, such that fixed addresses can be used for the code stream.

Figure 8:
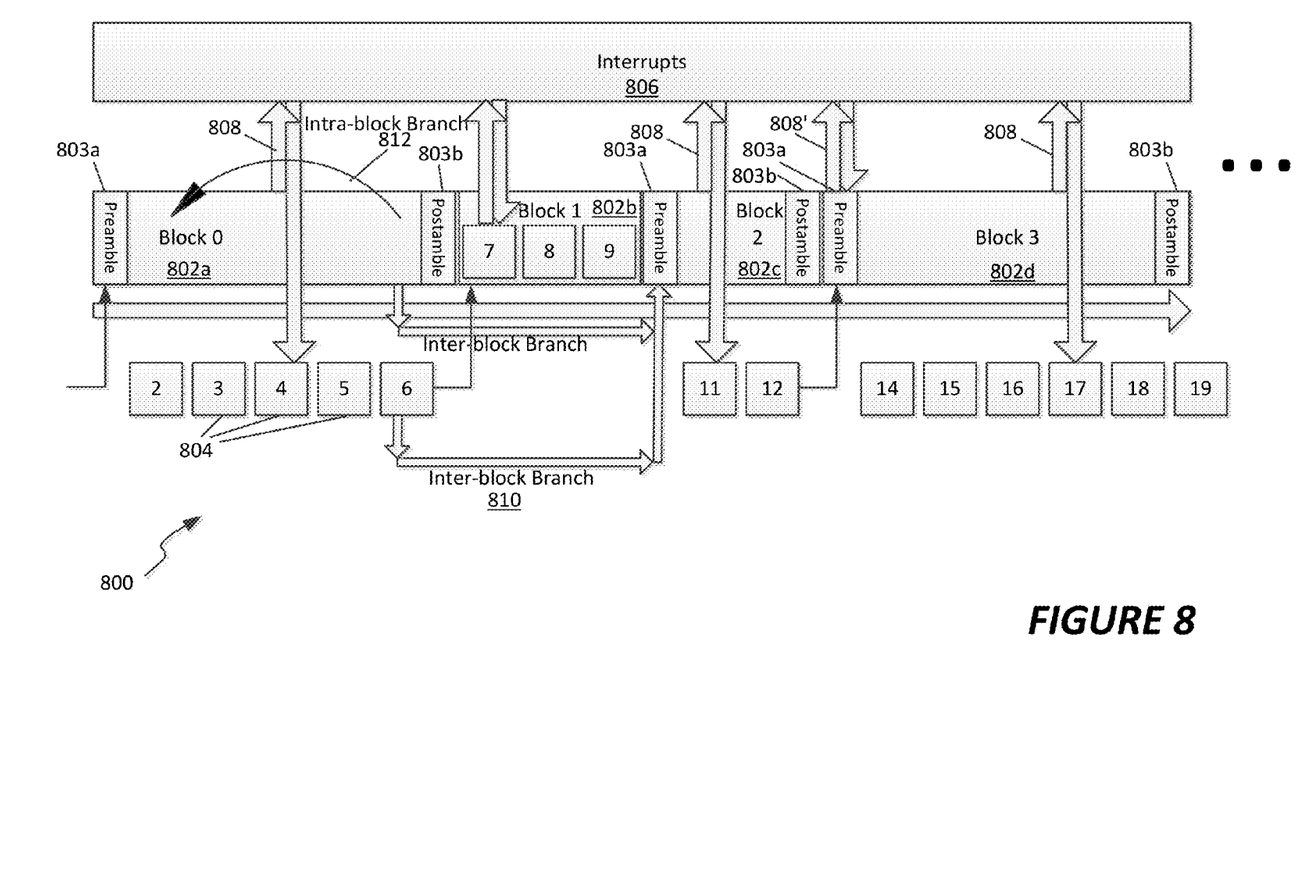
FIG. 8 is an example execution flow illustration of block-based execution of emulated code, according to a third example embodiment.

In some embodiments, the block formation operation 408 and translation operation 410 execute concurrently, such that a decision to form blocks, as well as to generate pre- and post-conditions associated with each block, is associated with the extent to which efficiencies are gained in translation of the non-native operators into native, translated operators. For example, if insufficient efficiencies are gained by forming a block, that block will not be formed, and instead translated operators will be executed within the emulator on an operator-by-operator basis. An example of such an arrangement is illustrated in FIG. 8.

In certain embodiments, the block formation operation 408 may be repeated asyncronously, such that one or more blocks of operators can be retranslated into new blocks for replacement in the code stream, forming a new native code stream including that newly formed block. This may occur, for example if enhancements are discovered in translating non-native operators into native operators. In such cases, the block formation operation 408 can replace an earlier-translated block with a new translated block that realizes additional efficiencies based on new translation patterns. Examples of such translation patterns are discussed in copending U.S. patent application Ser. No. 13/246,273, entitled "Abstracting Computational Instructions to Improve Performance", filed Sep. 27, 2011, the disclosure of which was previously incorporated by reference.

Figure 6:
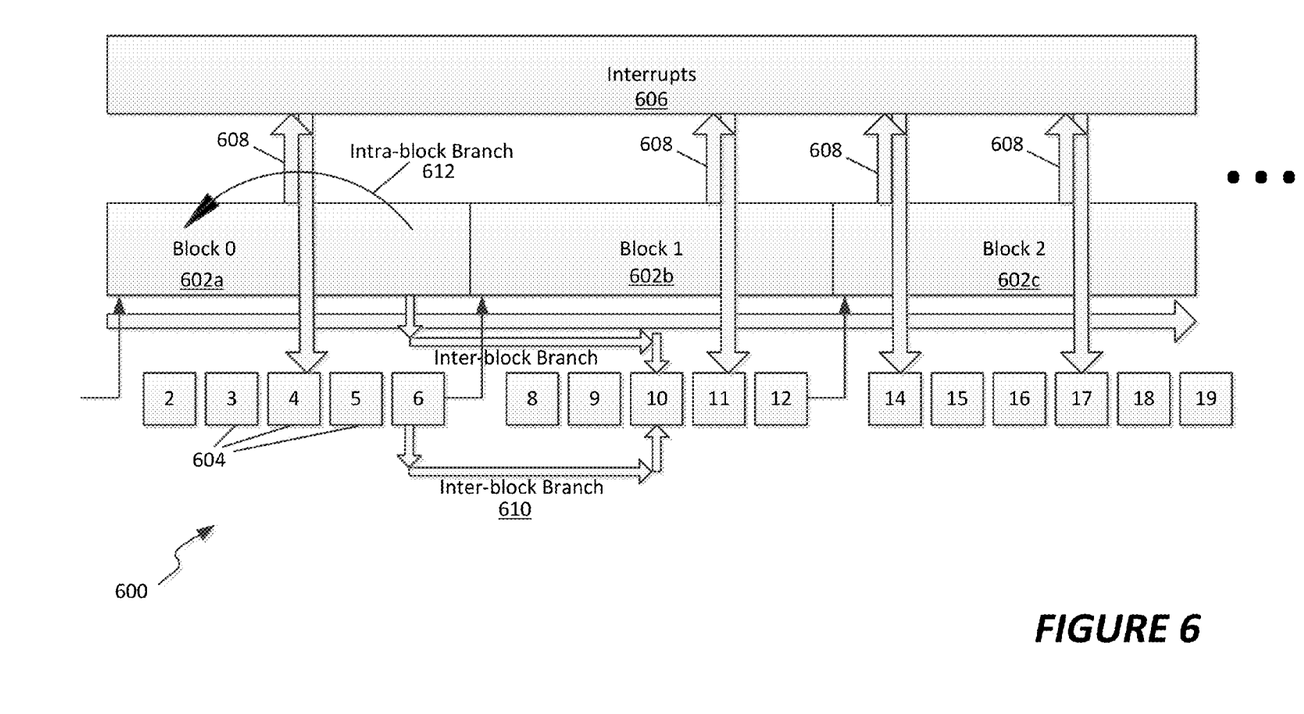
FIG. 6 is an example execution flow illustration of block-based execution of emulated code, according to a first example embodiment.
Figure 7:
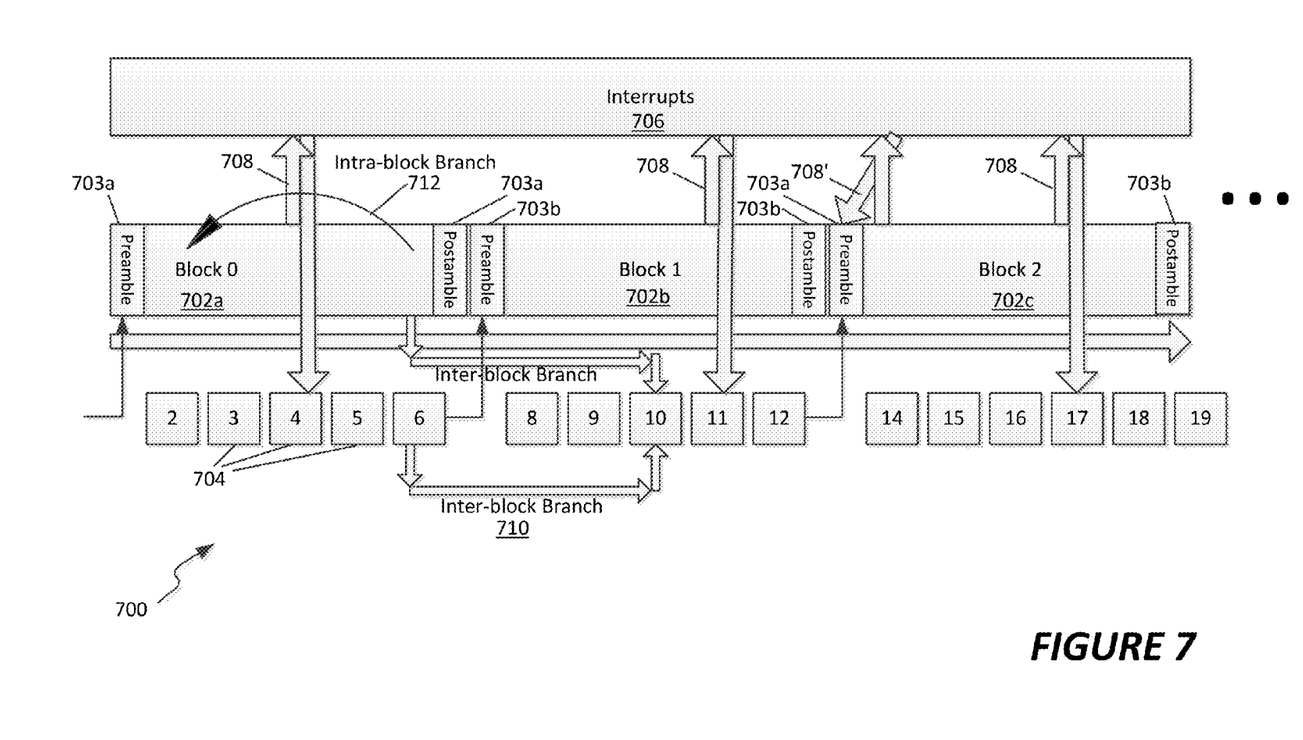
FIG. 7 is an example execution flow illustration of block-based execution of emulated code, according to a second example embodiment.

An execution operation 412 executes the translated, block-based code stream. Further details regarding example execution of a block-based code stream are discussed in connection with FIG. 5, below, and example execution sequences of segments of different types of formed, block-based code streams are illustrated in FIGS. 6-8. Operational flow terminates at an end operation 414, which corresponds to completed execution of the translated, block-based code stream.

Figure 5:
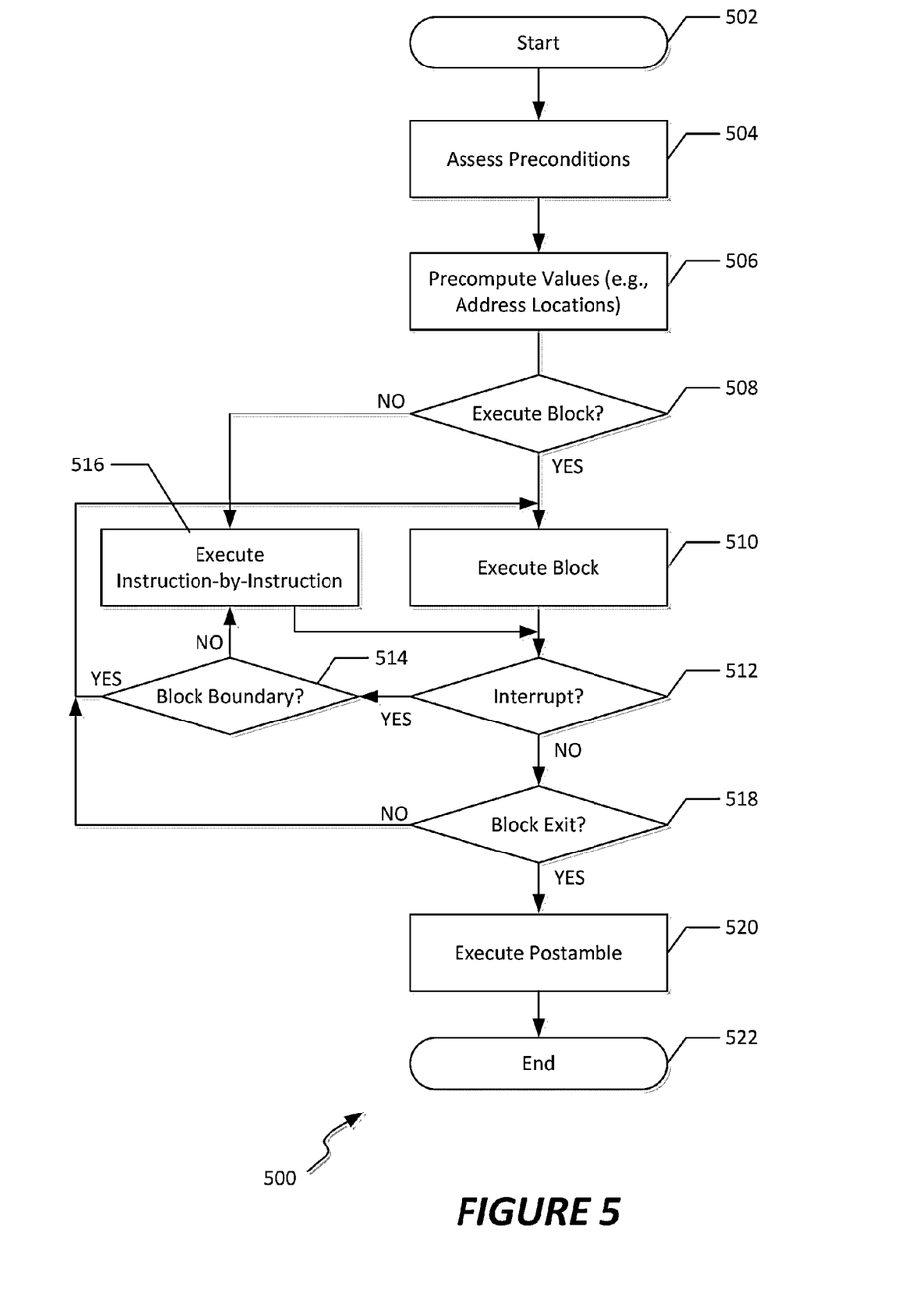
FIG. 5 is a flowchart of a method for executing a block of instructions generated from a non-native code stream on a computing system, according to a possible embodiment of the present disclosure.

Referring now to FIG. 5, a flowchart of a method 500 for executing a block of instructions generated from a non-native code stream on a computing system is disclosed, according to a possible embodiment of the present disclosure. The method 500 is instantiated at a start operation 502, which generally corresponds to initiation of execution of an emulated code stream after that code stream is translated from a non-native code stream and grouped into one or more blocks of operators. In particular, the method 500 represents execution within an emulator of at least one formed block in a block-based, translated code stream intended for execution (rather than the overall code stream).

A precondition assessment operation 504 assesses one or more preconditions included in a preamble of a block of translated operators, to ensure that assumptions inherent in the operators included in that block are not false. For example, the precondition assessment operation 504 may determine a remaining stack size or stack location, register values, or other conditions that are assumed by one or more of the set of operators included in the block. A precomputation operation 506 optionally precomputes one or more addresses of data, for example determining a physical address on the native computing system that is implicated by a particular virtual addressing scheme included in a non-native operator.

In certain embodiments, the precondition assessment operation 504 or precomputation operation 506 may perform one or more operations to simplify execution of operators within a block. For example, one or both modules 504, 506 may push a system stack expected by the operators in the block to memory to allow for direct access and modification of each stack value, or may precalculate direct addresses of local data values and cache those addresses for use by operators within the block. Additionally, arrays may be moved to locations where sufficient memory resources exist. Other operations may be performed as well.

In some circumstances, even if all preconditions and precomputations are performed, a block may not be able to be executed without causing an interrupt. Furthermore, in some circumstances, not all preconditions of a block may be capable of resolution prior to execution of the operator associated with a particular precondition. This may be the case, for example, where an operator in the block triggers access to a paged memory location, or in case operator arguments are received in a format not expected by the operator or block (e.g., an integer operator receiving a real number, which might be valid but not optimized for block-based execution). In such circumstances, it may be inadvisable to execute operators on a block-by-block basis, but instead to execute those operators on a more standard operator-by-operator basis. Accordingly, a block execution determination operation 508 assesses whether to execute a set of operators in the code stream as an optimized block, or whether to execute those operators on an operator-by-operator basis. If block-based execution is appropriate, operational flow proceeds to an execution operation 510; however, if execution of the preamble determines that preconditions of a block are incapable of being met prior to execution of the block, operational flow proceeds to a non-block execution operation 516, operation of which is described below.

The execution operation 510 corresponds to execution of the block for which the preconditions and values have been assessed and computed, such that each of the now-translated, native operators can be executed without requiring system checks or other overhead between such operators. In certain embodiments, the execution operation can be triggered by the emulator to initiate a worker thread that is dedicated to execution of the operators included within the block.

An interrupt assessment operation 512 determines whether an interrupt occurs during execution of the block. In one example embodiment, if an interrupt has occurred, a block boundary assessment operation 514 determines whether the interrupt occurs while at a block boundary (e.g., during execution of a preamble or a first operator within a block). If at a block boundary, operational flow returns to the execution operation 510, which, because no operators have yet completed execution (e.g., because the interrupt occurred either before or during execution of the first operator in the block) thereby restarts execution of the block. If not at a block boundary (i.e., some amount of work could be performed within a first operator, or execution flow could be within any subsequent operator), the interrupt in theory could result in changed characteristics of one or more memory subsystems, data locations, or other features that are assumed to have a particular state by the operators included in the block. As such, operational flow proceeds to a non-block execution operation 516, which corresponds to exiting block-based execution of the operators included in the block, and transfer to traditional, operator by operator, instruction-by-instruction execution of the operators included in the block. Within the non-block execution operation 516, each operator is managed by using associated checks of preconditions occurring before execution of that operator, rather than grouped checking of preconditions. In such embodiments, the operator that was interrupted during block-based execution in the execution operation 510, or a next operator if that operator was completed, could be executed accordingly.

In certain embodiments, the precondition assessment operation 504 or precomputation operation 506 may "proactively" execute one or more interrupt conditions, for example handling I/O operations or other occurrences normally managed by the native operating system. By raising interrupts proactively prior to execution of the operators included in a block (e.g., in a preamble), the probability of needing to exit a block due to interrupt handling can be dramatically reduced. Furthermore, the number of checks for the interrupt conditions themselves may be eliminated from the block as it can now assume that any required service interrupts were processed prior to entry into the block. This limits the number of instances in which efficiencies lost by requiring a shift back to operator-by-operator execution In certain other embodiments, the block boundary assessment operation 514 also can determine whether operation is currently at a postamble of the block. In such embodiments, the interrupt might, in such embodiments, continue operation at the postamble, depending on the type of operations included in the postamble.

A block exit operation 518 determines if no interrupt occurs during execution of a block, or if execution of operators included in the block is otherwise completed (e.g., within the non-block execution operation 516). If execution of the block is not yet completed (e.g., either exited due to completion or due to an interrupt), operation proceeds to a postamble execution operation 520. Otherwise, operational flow returns to the execution operation 510 for completed block-based execution of operators.

The postamble execution operation 520 optionally executes one or more post-conditions, such as may be required to return the system to a consistent state. This ensures that any state changes performed during execution of the block are correctly reflected or committed such that external processing elements have visibility to those state changes. The postamble execution operation 520 can take any of a number of operations. Generally, state changes within a block may only be visible within a block depending on the scope of the entity being updated. For example, if a variable is local only to the block, no other block of code would have visibility to it and the highest levels of optimization may be performed. On the other hand, if a variable resides at a more global scope, any update to that variable may or may not have to be reflected immediately depending on whether or not other threads of execution exist which have visibility to said variable.

An end operation 522 corresponds to completed execution of a formed block, which can lead, for example to execution of a next block in a code stream or subsequent instruction-by-instruction execution.

Referring to FIGS. 4-5 generally, in certain embodiments, following execution of a code stream one or more times using the block-based optimizations discussed herein, that code stream can be analyzed to determine paths typically taken or not taken through branch operations, as well as typical interrupt frequency when a particular code stream is executed. In such embodiments, the block formation operation 408 and the translation operation 410 may be modified to ensure that block boundaries occur at particular times where such interrupts or branch targets are likely to occur, but that block boundaries are not located within the code stream at unvisited branch destinations or at locations that are not typically associated with interrupts, to avoid having to preassess or precompute any conditions associated with a block boundary when it is unlikely that such conditions would have changed.

Referring now to FIGS. 6-8, code stream execution flows are illustrated which reflect various possible embodiment of the present disclosure. In FIG. 6, a first execution flow 600 is shown, illustrating block-based execution of emulated code. In this embodiment, execution of three contiguous blocks 602*a-c* is illustrated, in which each block includes a plurality of operators 604; those operators are also included in a non-block execution stream (numbered operators 2-19). In the embodiment shown, each operator at the beginning of a block need not be maintained outside of that block (e.g., operators 7 and 13) because they would always be executed within a block (e.g., preconditions checked for those operators would be checked regardless of whether they execute within a block). An interrupts flow 606 indicates that, during execution of any given block 602 or operator 604, an interrupt could occur.

In the embodiment shown, the blocks 602*a-c* are contiguous and end-to-end, such that each operator 604 in a code stream is associated with a block 602, and each block is only constructed from operators. A block 602 is entered by checking one or more preconditions, as determined by the emulator within which the code stream is executed. In this embodiment, it is assumed that the preconditions relate to the system as a whole, such that, once preconditions are assessed (e.g., to determine size and location of arrays, as well as their paged/unpaged status, stack location and size, register or memory locations/values, and code that may or may not be discarded. Based on this assumption, the fact that execution is occurring within a block (e.g., block 602*a*) allows the emulator to assume that any preconditions have not changed, and that it is acceptable to operate within a block, as opposed to performing operator-by-operator execution of the code stream, with preconditions checked before each operator.

In this embodiment, execution within a block (e.g., Block 0 602*a*) will lead to execution within a next subsequent block (e.g., Block 1 602*b*), and will continue until execution flow changes. This could occur, for example, due to a flow control operation that implicates a different and noncontiguous block, such as an interrupt or procedure call/return, or a branch operator that extends beyond the boundaries of the block it resides. When executing within a block 602, occurrence of an interrupt 608 within the execution flow, will cause execution of operators within the block to be halted, and when the interrupt is completed, execution will return to the equivalent non-block operator (e.g., operators 4, 11, 14, 17 of FIG. 6).

Additionally, as illustrated in instruction flow 600, inter-block branch 610 corresponds to an interblock branch operation (i.e., operator 6 of operators 604 referencing operator 10), external to block 602a. In this case, because the branch may result in a different set of assumptions, and because the block is configured for consecutive execution, the branch target may be either positioned at a beginning of a block, or block-based execution must be exited. In the example shown, interblock branch 610 results in non-block execution of operator 10; upon completion of operator 12, assumptions can be re-evaluated by an emulator, and block 602c can be entered to continue block based execution going forward (e.g., until the next branch or interrupt). In contrast, an intrablock branch may not require the block 602 to be exited (see intrablock branch 612) at all.

Referring now to FIG. 7, a second example execution flow 700 is shown. In this embodiment, blocks 702a-c are again laid end-to-end (i.e., are contiguous); however, in this embodiment, each block includes a preamble 703a and a postamble 703b. The preamble 703a and postamble 703b execute preconditions and postconditions, respectively, which may be associated with each block 702. For example, in an embodiment where direct addressing is used (e.g., using an Intel-based x86 instruction set architecture) for native operation, the preamble may manipulate local variables in memory, or may push a current stack state as assumed by the non-native code stream entirely to memory, to allow any of the stack values to be directly updated (rather than requiring an artificial set of operators that represent stack operations, where no stack may exist on the target native computing system). In another example, the preamble 703a can include an identity of one or more local data values or variables that are used with high frequency, and can cache the address for that data value or variable to avoid multiple address calculations within the block. In such an embodiment, the preamble 703a will calculate addresses for such commonly-used memory locations, and code will be emitted by the emulator that includes those precalculated values. Other types of preconditions or precalculations could be included in the preamble 703a as well. In contrast, postamble 703b is responsible for maintaining state coherency; in other words, returning the system to a state as assumed by the next set of operators or next block in operational sequence within the execution flow 700. It is noted that, in the embodiment shown in FIG. 7, one or more interrupts 708 cause operational flow to transition to an interrupts flow 706 analogous to that described in FIG. 6; however, in this embodiment, if the interrupt occurs during execution of either a preamble 703a or a first operator within a block, operational flow following the interrupt can return to the beginning of the block, and re-execution of the preamble. This is because the preamble 703a will revalidate the assumptions made in executing the block (e.g., as shown at interrupt 708' at the beginning of block 702c). In other respects, treatment of interblock branches 710 and intrablock branches 712 are as discussed above with respect to FIG. 6.

FIG. 8 illustrates a third possible embodiment of an execution flow 800. Execution flow 800 generally corresponds to those described above, and includes blocks 802, operators 804, and interrupt processing 806 as previously described. In this embodiment (as compared to the embodiments of FIG. 6-7), not all blocks are streamlined, or "optimized"; in other words, in certain cases preconditions and postconditions are not grouped, and no preamble or postamble may be present with respect to one or more blocks. This may be the case where operators 804 that are to be included in a block (see block 802b) have a variety of different preconditions such that limited to no efficiency is gained by block-based execution of those operators. An example of such a situation may occur if there are too few operators in a particular block to gain any efficiency, or in the case of an exception handling operator or no operation operator (NOP).

In addition, execution flow 800 illustrates an example of an interrupt occurring within a preamble of block 802d (interrupt 808' of block 802d), further illustrating the point made above regarding interrupts at either a preamble 803a or a first operator within a block 802 returning operation to the block rather than external to the block. As illustrated above, however, interrupts 808 occurring during execution of operators that are not the first operator of a block will result in return of execution to an operator-by-operator process for the remainder of the operators that are associated with a block.

Figure 9:
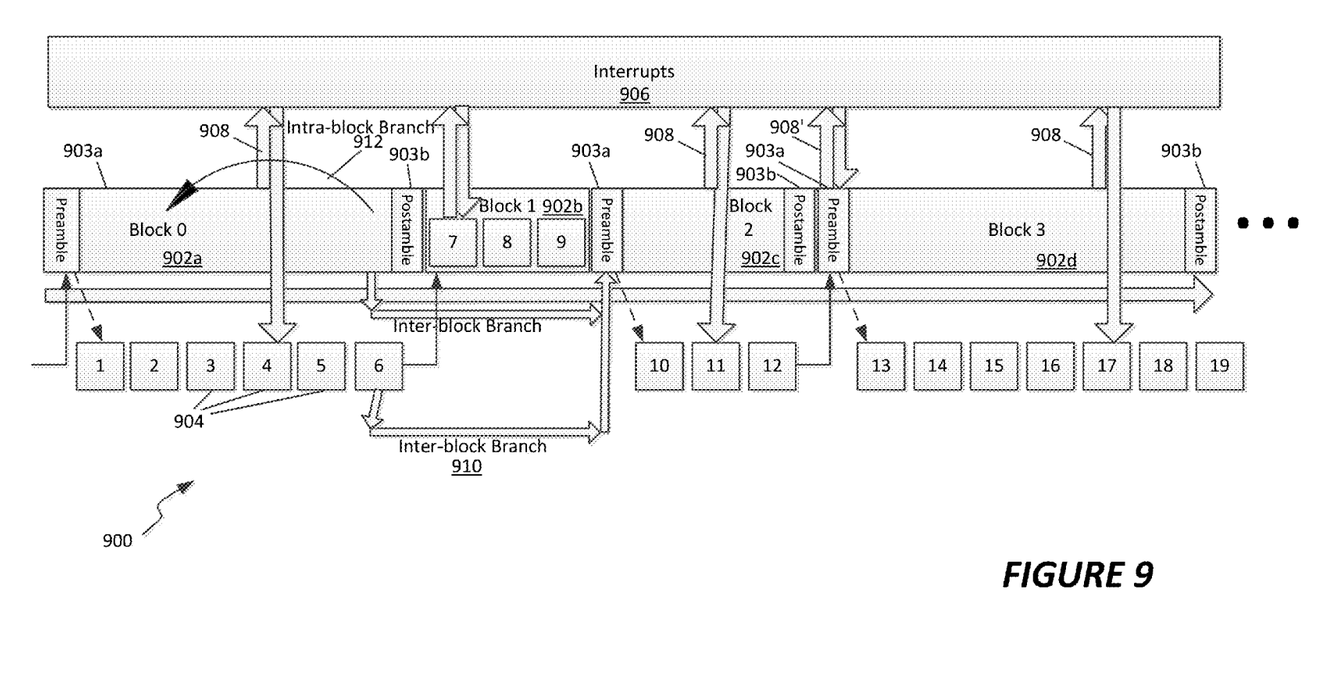
FIG. 9 is an example execution flow illustration of block-based execution of emulated code, according to a fourth example embodiment.

FIG. 9 illustrates a fourth possible embodiment of an execution flow 900. Execution flow 900 generally corresponds to those described above, and includes blocks 902, operators 904, and interrupt processing 906 as previously described. In this embodiment (as compared to the embodiments of FIGS. 6-8), each of the operators 904 included in a code stream are maintained outside of a block 902, even if the operator corresponds to a first operator within a block. As illustrated in FIG. 9, this is shown by the fact that operators 1, 7, and 13 are present in the execution flow 900, where they were absent in the above-described embodiments.

Maintenance of each operator 902 outside of the blocks 904 allows a emulator managing the execution flow 900 to determine, while executing a preamble 903, whether or not to enter a block in the first place. In the embodiment shown, a flow control operation 912 is illustrated in cases where an optimized block (e.g., blocks 902a, 902c, 902d) is exited, and each operator (including first operators of a block) is executed on an operator-by-operator basis. This may be elected by an emulator in the case where, during execution of a preamble 903 it is determined that preconditions cannot be performed which would allow execution of the optimized block, for example where a first operator defines access to paged memory, and an interrupt condition is triggered to access that memory location. In such cases, following execution of the preamble 903 operational flow proceeds on an operator-by-operator basis within that next block.

Referring generally to FIGS. 1-9, it is recognized that, in various workloads, differing sizes and lengths of blocks will be formed, depending upon the particular collection and ordering of operators included in a code stream. In situations where a large number of operators can be included in a particular block, that number of operators results in increased efficiency in execution of the code, since large numbers of operators could be executed in sequence without requiring checks of conditions between operators. Additionally, within each memory segment, the vast majority of memory blocks can be treated as "optimized" blocks; as such, even if not all blocks are included within a streamlined execution flow with preconditions assessed, a large number of such blocks could be used in a particular workflow. Additional advantages can be realized using the streamlined execution processes described herein as well.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A method for executing a non-native code stream on a computing system, the method comprising:

forming one or more blocks of emulated mode code for execution on a computing system, each of the one or more blocks including a preamble and a plurality of operators ordered for execution in a predetermined sequence, wherein for a specified block the preamble defines one or more conditions required for uninterrupted execution of the operators included in the specified block;

assessing the one or more conditions associated with the specified block; and after assessing the one or more conditions, executing each of the operators included in the specified block without assessing any of the one or more conditions between execution of the operators within the specified block.

2. The method of claim 1, wherein a first operator within the specified block is located at a branch target address.

3. The method of claim 1, wherein a first operator within the specified block is a target of a flow control operator.

4. The method of claim 1, further comprising, upon occurrence of an interrupt while executing the operators included in the specified block:

handling the interrupt; and returning execution to the specified block.

5. The method of claim 1, further comprising, prior to executing each of the operators included in the specified block, translating each of the operators into native instructions executable on the computing system.

6. The method of claim 5, wherein translating each of the operators into native instructions executable on the computing system includes parsing the operators included in the specified block to locate one or more sequences of two or more non-native operators that correspond to one or more native instructions executable by the computing system.

7. The method of claim 6, wherein parsing the operators included in the specified block to locate one or more sequences of two or more non-native operators includes executing a pattern-matching algorithm on the non-native operator.

8. The method of claim 1, wherein each of the one or more blocks includes a postamble.

9. The method of claim 1, wherein executing each of the operators included in the specified block includes executing an intra-block branch operation.

10. The method of claim 1, further comprising, after assessing the one or more conditions associated with the specified block, adjusting a stack associated with the emulated mode code prior to executing each of the operators included in the specified block.

11. The method of claim 1, further comprising, after assessing the one or more conditions associated with the specified block, precomputing one or more data locations in memory associated with the emulated mode code.

12. The method of claim 1, wherein the emulated mode code comprises a translated version of the non-native code stream configured for execution on a native instruction set architecture associated with the computing system.

13. The method of claim 1, further comprising:

assessing one or more conditions associated with a second block of the one or more blocks; and after assessing the one or more conditions, upon determining that one or more conditions cannot be met prior to execution of the second block, returning execution to emulated mode code outside the second block.

14. A system comprising:

an emulator configured to manage execution of a non-native code stream on a computing system, the emulator including a translation component configured to generate emulated mode code based on the non-native code stream; and a plurality of blocks of emulated mode code, each of the one or more blocks including a preamble and a plurality of operators ordered for execution in a predetermined sequence, wherein for a specified block the preamble defines one or more conditions required for uninterrupted execution of the operators included in the specified block;

wherein the emulator is configured to assess the one or more conditions associated with the specified block, and, after assessing the one or more conditions, execute each of the operators included in the specified block without assessing any of the one or more conditions between execution of the operators within the specified block.

15. The system of claim 14, wherein each of the one or more blocks includes a postamble.

16. The system of claim 14, wherein a first operator within the specified block is located at a branch target address.

17. The system of claim 14, wherein the translation component includes a pattern matching component configured to locate sequences of two or more non-native operators that correspond to one or more native instructions executable by the computing system.

18. The system of claim 14, further comprising a native operating system configured to generate a plurality of interrupts.

19. The system of claim 18, wherein the emulator is configured to delay execution of one or more interrupts from among the plurality of interrupts during execution of the specified block.

20. The system of claim 14, wherein the specified block is passed to a worker thread for execution on the computing system.

21. The system of claim 14, wherein the emulator is configured to assess whether to execute each of the operators included in the specified block, and, if contiguous execution of the operators included within the specified block is unlikely, the emulator is configured to execute operators outside of the specified block associated with the operators included in the specified block.

22. A computing system comprising:

a programmable circuit capable of executing operators according to a native instruction set architecture;

a memory operatively connected to the programmable circuit, the memory containing program instructions executable on the programmable circuit and which, when executed, cause the computing system to:

form a plurality of blocks of emulated mode code for execution on the programmable circuit from a non-native code stream, each of the plurality of blocks including a preamble, a postamble, and a plurality of operators ordered for execution in a predetermined sequence, wherein for a specified block the preamble defines one or more conditions required for uninterrupted execution of the operators included in the specified block;

assess the one or more conditions associated with the specified block;

after assessing the one or more conditions, execute each of the operators included in the specified block without assessing any of the one or more conditions between execution of the operators within the specified block; and upon completion of execution of the specified block, perform one or more operations defined in the postamble.

* * * * *